US008094156B2

(12) United States Patent
Smith

(10) Patent No.: US 8,094,156 B2
(45) Date of Patent: Jan. 10, 2012

(54) RIGLESS RETARGETING FOR CHARACTER ANIMATION

(75) Inventor: Jeffrey D. Smith, Montreal (CA)

(73) Assignee: AUTODESK Inc., San Rafael, CA (US)

( * ) Notice: Subject to any disclaimer, the term of this patent is extended or adjusted under 35 U.S.C. 154(b) by 0 days.

(21) Appl. No.: 11/496,217

(22) Filed: Jul. 31, 2006

(65) Prior Publication Data

US 2008/0024503 A1    Jan. 31, 2008

(51) Int. Cl.
    *G06T 13/00* (2006.01)
(52) U.S. Cl. .................................. 345/473; 345/949
(58) Field of Classification Search .................. 345/418, 345/473, 474, 660, 419, 949–960, 475
    See application file for complete search history.

(56) References Cited

U.S. PATENT DOCUMENTS

| | | | |
|---|---|---|---|
| 5,767,861 A | 6/1998 | Kimura | |
| 5,852,450 A | 12/1998 | Thingvold | |
| 5,966,141 A * | 10/1999 | Ito et al. ........................ | 345/473 |
| 6,166,746 A | 12/2000 | Inada et al. | |
| 6,203,425 B1 | 3/2001 | Hayashi | |
| 6,215,496 B1 * | 4/2001 | Szeliski et al. ................ | 345/419 |
| 6,326,972 B1 | 12/2001 | Buhler et al. | |
| 6,377,281 B1 | 4/2002 | Rosenbluth et al. | |
| 6,503,144 B1 | 1/2003 | Rimoto et al. | |
| 6,522,332 B1 * | 2/2003 | Lanciault et al. ............. | 345/473 |
| 6,535,215 B1 | 3/2003 | DeWitt et al. | |
| 6,626,759 B1 | 9/2003 | Matsuoka | |
| 6,697,071 B2 | 2/2004 | Iino et al. | |
| 6,976,918 B2 | 12/2005 | Hosokawa | |
| 7,012,608 B1 | 3/2006 | Fujisaki | |
| 7,068,277 B2 * | 6/2006 | Menache ....................... | 345/473 |
| 7,102,647 B2 | 9/2006 | Sloan et al. | |
| 7,104,890 B2 | 9/2006 | Tsuda et al. | |
| 7,106,334 B2 | 9/2006 | Imagawa et al. | |
| 7,126,607 B2 | 10/2006 | Emerson | |

(Continued)

FOREIGN PATENT DOCUMENTS

JP            09-330424           6/1996

(Continued)

OTHER PUBLICATIONS

Gleicher, Michael, "Retargetting Motion to New Characters", in Proceedings of SIGGRAPH 98, pp. 33-42, Jul. 1998.

(Continued)

*Primary Examiner* — Amare Mengistu
*Assistant Examiner* — Aaron M Guertin
(74) *Attorney, Agent, or Firm* — Patterson & Sheridan, LLP

(57) ABSTRACT

Motion may be transferred between portions of two characters if those portions have a minimum topological similarity. The portions or structures of the source and target character topologies may be represented as one or more descriptive files comprised of a hierarchy of data objects including portion identifiers and functionality descriptors associated with portions of the respective source or target topology. To transfer motion between the source and target characters, the motion associated with the portions or structures of the source character identified by a subset of source portion identifiers having corresponding target portion identifiers is determined. This motion is retargeted to and attached to the corresponding portions or structures of the target character identifiers. As a result, the animation of the portions of the target character effectively animates the target character with motion that is similar to that of the source character.

12 Claims, 4 Drawing Sheets

U.S. PATENT DOCUMENTS

| | | | |
|---|---|---|---|
| 7,168,953 | B1 | 1/2007 | Poggio et al. |
| 7,221,380 | B2 | 5/2007 | Hunter et al. |
| 7,225,129 | B2 | 5/2007 | Massaro et al. |
| 7,251,593 | B2 | 7/2007 | Dariush et al. |
| 7,253,817 | B1 | 8/2007 | Plantec et al. |
| 7,493,243 | B2 | 2/2009 | Choi et al. |
| 7,515,155 | B2 | 4/2009 | Anderson et al. |
| 2001/0004262 | A1 | 6/2001 | Mochizuki et al. |
| 2002/0050997 | A1 | 5/2002 | Iino et al. |
| 2002/0067363 | A1 | 6/2002 | Ohto et al. |
| 2003/0164829 | A1* | 9/2003 | Bregler et al. ............ 345/474 |
| 2003/0193503 | A1 | 10/2003 | Seminatore et al. |
| 2004/0001064 | A1 | 1/2004 | Boyd et al. |
| 2004/0012594 | A1 | 1/2004 | Gauthier et al. |
| 2004/0036689 | A1 | 2/2004 | Chiu |
| 2004/0160445 | A1 | 8/2004 | Whatmough |
| 2004/0179013 | A1 | 9/2004 | Menache |
| 2006/0061574 | A1 | 3/2006 | Ng-Thow-Hing et al. |
| 2006/0139355 | A1* | 6/2006 | Tak et al. ............ 345/473 |
| 2006/0181535 | A1 | 8/2006 | Watt |
| 2006/0262119 | A1* | 11/2006 | Isner ............ 345/473 |
| 2006/0274070 | A1 | 12/2006 | Herman et al. |
| 2007/0024632 | A1 | 2/2007 | Couture-Gagnon |
| 2007/0030266 | A1 | 2/2007 | Styles |

FOREIGN PATENT DOCUMENTS

| | | |
|---|---|---|
| JP | 09-073559 | 3/1997 |
| JP | 11-185055 | 12/1997 |

OTHER PUBLICATIONS

English Translation of JP 11-185055.

English Translation of JP 09-330424.

Motobayashi et al. "Assimilated Motion Generation for Characters with Various Features," Journal of Institute of Electronics, Information and Communication Engineers, Information and System II—Pattern Processing, Japan, Jul. 1, 2004, vol. J87-D-II, No. 7, pp. 1473-1486.

English Abstract of "Motobayashi et al." (Provided as explanation of relevance).

Yukawa et al. "Human Motion Description System Using BUYO-FU," Journal of Information Processing Society of Japan, Japan, Information Processing Society of Japan, Oct. 15, 2000, vol. 41, No. 10, pp. 2873-2880.

English abstract of "Yukawa et al." (Provided as explanation of relevance).

James, et al. "Skinning Mesh Animations," SIGGRAPH '05: ACM SIGGRAPH 2005 Papers, pp. 399-407.

Mohr, et al. "Building Efficient, Accurate Character Skins From Examples," ACM Transactions On Graphics, vol. 22, No. 3, Jul. 2003, pp. 562-568.

Florian Loitsch, "Maya File Translator," 2004. http://florian. Loitsch. com/gpExport/oldDocs/report.html.

Antony Ward, "Game Character Development with Maya", 2004, New Riders.

Office Action. U.S. Appl. No. 12/220,254 dtd. Aug. 20, 2009.

Office Action. U.S. Appl. No. 11/496,241 dtd. Sep. 2, 2009.

Office Action, U.S. Appl. No. 11/496,241, dated Apr. 14, 2010.

Sumner, et al. "Deformation Transfer for Triangle Meshes," ACM Trans. Graph. 23, 3 (Aug. 2004), pp. 399-405.

Office Action, U.S. Appl. No. 12/220,254, dated Nov. 12, 2010.

Monzani, et al. "Using an Intermediate Skeleton and Inverse Kinematics for Motion Retargeting", Eurographics 2000, vol. 19, No. 3. 9 Pages.

Huang, et al. "Interactive Visual Method for Motion and Model Reuse", ACM, 2003, pp. 29-36 and 293.

Hsieh, et al. "Motion Retargetting and Transition in Different Articulated Figures," 9th International Conference on Computer Aided Design and Computer Graphics, 2005.

English translation of JP 09-073559, provided as explanation of relevance.

Office Action, U.S. Appl. No. 12/291,163 dated Jun. 28, 2011.

* cited by examiner

RIGLESS RETARGETING FOR CHARACTER ANIMATION

BACKGROUND

In computer animation, a character generally is defined by a rig, and an associated geometry, often called a skin or envelope. A rig is a character skeleton comprised of a number of interconnected elements that has been augmented with one or more animation controls and constraints to facilitate use, and is the fundamental workspace of the animator. Each element in the rig is defined in three dimensions by vectors defining its position, orientation and scaling, as well as other animation- or display-specific properties. Various algorithms control the relationship between the rig and the geometry to produce the look of a character.

Various techniques may be used to manipulate a character to provide the appearance of animation. One technique is to specify a series of key frames that describe motion of the character over time, using a combination of inverse and forward kinematics and character rigging techniques. Another technique is to use motion capture data representing the position and orientation of selected elements of the topology of a character over time. For example, motion may be captured using sensors attached to a live actor. The motion capture data may be used to derive the topology of a character representing the live actor. The motion capture data then is used to animate that character. Other techniques include using constraints, scripts or expressions.

Generating realistic character motion for computer animation is a difficult task. Typically, character animation is done by hand, requiring a great deal of work by skilled artists. The end result of such effort is typically a motion (or sequence of motions) that is specific to one particular character. If the animator wishes to have the "same" animation on a different character, he or she will typically have to re-do the animation from scratch. As the demand for character animation rises, due to increasing use of CG effects in movies, as well as next-generation video games, content producers are focusing more and more on the problem of animation reuse: applying completed animation from one character to another, different, character in an automated fashion.

The most commonly used technique for character animation reuse is a process called motion retargeting, which can transfer animation between a source character and a target character using a combination of inverse kinematic and forward kinematic algorithms. Motion retargeting algorithms generally require that the source and target characters have identical structures, or that the target character has a simpler underlying "rig" than the source character. With these constraints, motion retargeting can be performed between characters having the same structure but different proportions. See, for example, "Retargeting Motion to New Characters," by Michael Gleicher, in *Proceedings of SIGGRAPH 98*, pages 33-42, July 1998. In practice, motion retargeting is restricted to retargeting motion capture data to pre-defined rig structures, and in limited cases moving animations from one pre-defined rig to another, due to the narrow constraints of current methods. Motion retargeting techniques map motion from the source rig to the target rig by analyzing these rigs and applying the appropriate kinematic calculations. Problems arise, however, when the source and target rigs are different, such as when it is desired to map motion from a biped source character to a quadraped target character or to a character having no skeletal structure at all.

SUMMARY

In practice, it would be desirable to transfer motion from one character to another character of an arbitrarily different topology, including motion transfers wherein either or both of the characters have a topology that includes no skeletal structure. It would also be desirable to transfer motion from a single object (e.g., a skeletal feature) of a character topology to multiple corresponding objects, skeletal or otherwise, in another character topology. It would be further desirable to transfer motion in such a way that an animator can use animation controls in a familiar manner, instead of requiring the animator to manipulate dense motion data.

Motion can be transferred between characters of different topologies if those characters have a minimum topological similarity, even if one or both of the characters is rigless (i.e., has no skeletal structure.) Motion also may be transferred between portions of two characters, including transfers from one portion of a source topology to multiple associated portions of a target topology, if those portions have a minimum topological similarity. The topology of a character can be represented, as an alternative to a rigged representation, as one or more descriptive files each organized as a hierarchical arrangement of labeled data objects corresponding to portions of the topology. Each data object may include a unique identifier for the associated portion of the topology and an associated functionality descriptor signifying particular actions or properties to a retargeting operator or algorithm.

In particular, motion can be transferred from a source character to a target character if a subset of portion identifiers of the topology of the source character can be matched to a corresponding subset of the portion identifiers of the topology of the target character. The present invention permits motion retargeting between any two characters having a subset of matching portion identifiers in the associated descriptive files of source and target characters, including characters having no skeletal structure. Rigless retargeting also permits retargeting motion from one portion of a topology of a source character to multiple portions of a target topology.

To transfer motion between the source and target characters, a subset of identifiers of the source character descriptive file corresponding to a subset of unique identifiers of the target character descriptive file is identified. This identification process may be guided by the user in an interactive manner, or may be done automatically during character evaluation by a computerized retargeting system. The motion associated with the structures of the source character that correspond to the subset of portion identifiers is determined. This motion is retargeted to the corresponding subset of portion identifiers of the target character. The retargeted motion is then attached to the structures of the target character topology corresponding to the matched subset of portion identifiers of the target character descriptive file. As a result, the animation of the portion of the topology of the target character effectively animates the target character with motion that is similar to that of the source character.

The labeled data objects representing the target character may also be associated with animation controls that control the animation of the target character. For example, a source descriptive file may be arranged such that hip and chest data objects control the animation of objects in a spine connected between the hip and the chest. If the hip and chest objects also are labeled objects of the target character, then motion transferred from the corresponding hip and chest structures of the source character can be used to animate the structures of the spine of the target character.

In one embodiment of rigless retargeting, a set of vector maps is defined to represent the orientations of the portions or structures of the characters associated with the labeled data objects. One vector map represents the portions of the source character. Another vector map represents the portions of the target character.

Because the frames of reference of structures or elements within the source and target characters may be different, transformations among these frames of reference are computed. In one embodiment, a user places the source character and the target character in the same pose through use of a graphical user interface. A transformation between the frames of reference of the labeled portions of the source and target characters is determined. The motion of the structures of the source character associated with the matching portion identifiers is retargeted to the corresponding structures associated with the matching portion identifiers of the target character using this transformation and the vector maps representing the set of corresponding structures of source and target characters. Alternatively, the transformations between the frames of reference for the source character and the frames of reference of a canonical reference pose may be computed. These transformations may be stored with the source character. The motion of the structures associated with the subset of matching portion identifiers of the source character is retargeted to a canonical reference pose using this transformation and the vector maps representing the set of structures corresponding to the matching portion identifiers of the source character and the canonical reference pose. In this embodiment, the result is a normalized representation of the motion of the structures of the source character corresponding to the matching portion identifiers. This normalized motion can be stored, along with a representation of the canonical reference pose to which it corresponds, thus providing the capability of building a library or database of motion for different characters that can be reused for many different target characters. Another transformation between the frames of reference of a target character of the same type or class and the frames of reference of the canonical reference pose is computed. This transformation can be stored with the target character. Given a set of source characters and target characters of the same broad class (e.g. biped or quadruped), these transformations normalize orientations across the class of characters. The stored normalized motion then can be retargeted to the structures of the target character corresponding to matching portion identifiers using this transformation and the vector maps representing the set of the corresponding structures of the target character and the canonical reference pose.

DETAILED DESCRIPTION

Figure 1:
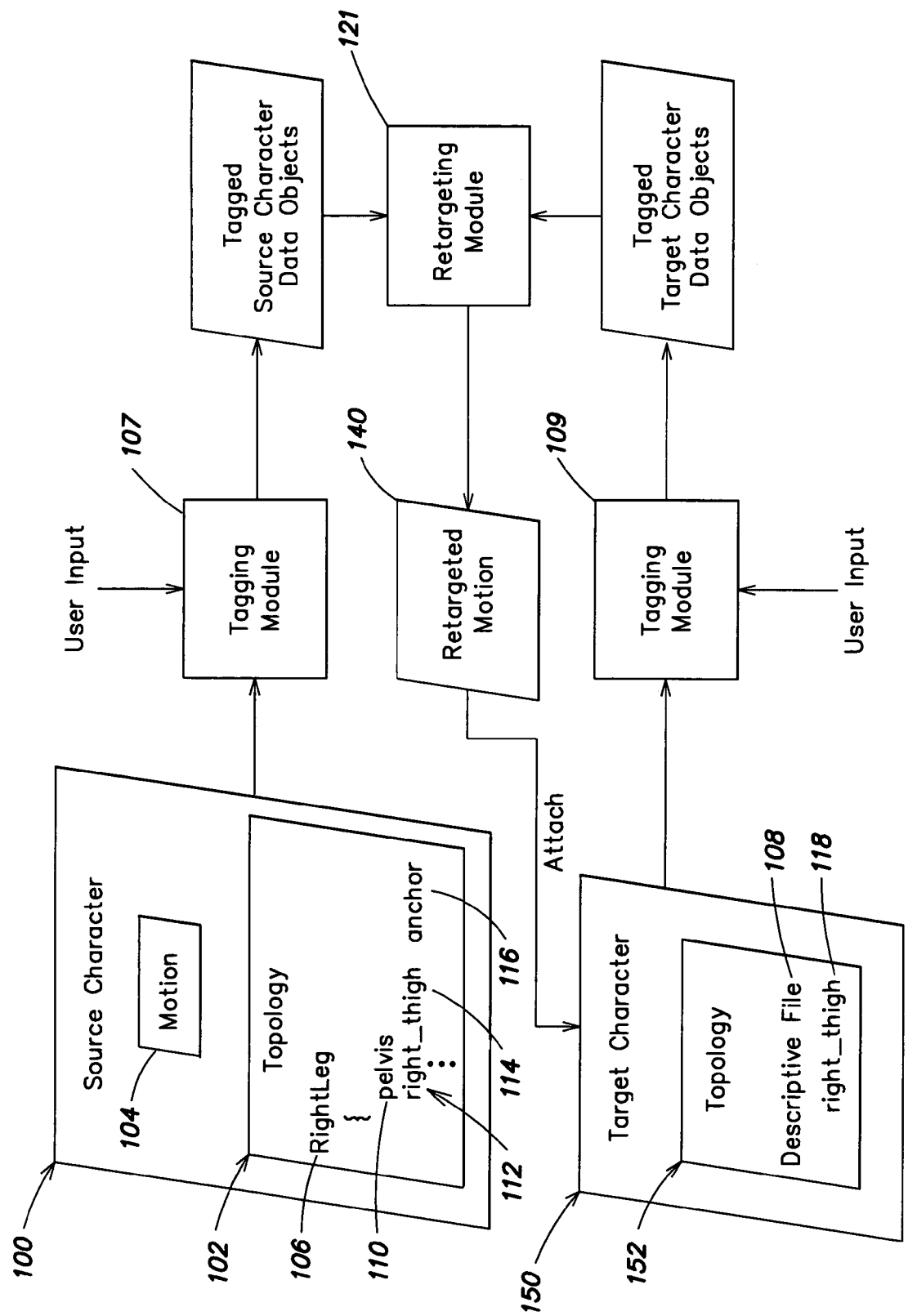
FIG. 1 is a data flow diagram of an embodiment of a system for transferring motion from a source character to a target character.

Referring now to FIG. 1, a source character 100 is defined by a topology 102 and an associated geometry. Various algorithms control the relationship between the topology and the geometry to produce the look of a character. Similarly, a target character 150 is defined by a topology 152 and an associated geometry.

Various techniques may have been used to define motion for the source character. Generally, such techniques involve associating one or more animation controls with one or more elements of the topology in a process called rigging. One technique is to specify a series of key frames that describe motion of the character over time, using a combination of inverse and forward kinematics and character rigging techniques. Another technique is to use motion capture data representing the position and orientation of selected elements of the topology of a character over time. For example, motion may be captured using sensors attached to a live actor. The motion capture data may be used to derive the topology of a character representing the live actor. The motion capture data then is used to animate that character. Other techniques include using constraints, scripts or expressions. The target character also may be rigged in a manner that will improve its ability to be animated through motion transferred from the source character.

A rigless retargeting system employs one or more plain-text descriptive files 106,108 to represent the source topology 102 and target topology 152. For example, one portion of the source character topology may be represented by the descriptive file

```
RightLeg
{
    pelvis          parent
    right_thigh     anchor
    right_shin      child
    right_foot      friction
}
```

The right leg of source character 100 has been defined to include a hierarchical arrangement of data objects 110,112 that should be present in order to have motion retargeted to or from the source character. In the example above, the leg is attached to an object with the label pelvis, and includes three further objects, labeled right_thigh, right_shin and right_foot respectively. Each data object 110,112 includes a portion identifier 114 and a functionality descriptor 116 associated with portions of the source topology 102. The functionality descriptors (e.g., anchor, child, etc.) will be interpreted in the retargeting process as designating particular relationships (among the data objects and their associated portions or structures) or actions.

Thus, if there are RightLeg descriptive files on different rigs of source character 100 and target character 150, each of which have been similarly labeled, motion can be transferred between them without having to rely on the structure of the rigs themselves. Note that nowhere in the descriptive file are references made to the typical elements of a rig (e.g., bones, geometry, constraints, etc.) Indeed, any portion of a character with a well-defined position and rotation can be labeled right-_thigh, and can be used for motion retargeting. By offloading the hierarchical information implicit in the structure of a rig to a simple descriptive text file, motion retargeting algorithms are permitted to operate on a much wider variety of objects. The descriptive files can be considered an abstract, implicit rig that may be used to guide the motion from the source rig, as it is transformed and reapplied to the target rig.

Source character motion 104 can be transferred to target character 150, even if the characters have different topologies, provided the characters have a minimum topological similarity as identified by the portion identifiers 114,118. In particular, motion can be transferred from a source character to a target character if a subset of portion identifiers representing the topology of the source character can be matched to a subset of portion identifiers associated with the topology of the target character. The matching portion identifiers that form these subsets are called herein "tagged portion identifiers." All characters having the same set of tagged portion identifiers may have motion mapped between them. Two different biped characters may have, on the surface, very different topologies; however, these characters each may have the same primary skeletal structures or portions. For example, any biped likely has elements representing a head, neck, chest, arms, spine, hips and legs. Motion can be transferred to the structures in a target topology from a source topology if, in the descriptive files representing their respective topologies, matching portion identifiers exist corresponding to those elements or portions.

With reference again to FIG. 1, a user may identify through a textual or graphical user interface the data objects associated with the source and target characters for which motion retargeting is desired. In particular, the portion identifiers 114,118 of each character is tagged, by tagging modules 107,109 in response to user input, to indicate which identifiers are the tagged portion identifiers. For example, a user interface may be provided to permit a user to select an element or portion of a topology of a character and to associate a label with it. Topology portions with the same tagged portion identifier in different topologies can be deemed to be corresponding topology portions or elements for the purposes of motion transfer. Similarly, the user may indicate certain portions of the target or source character should be ignored by the motion transformation algorithm (referred to herein a "mutable tagging.") For example, a user may transfer the motion of the legs (but not the arms) to one target character and then, without re-labeling the source character, transfer the motion of the legs (but not the arms) to a second character.

Ideally, the tagged portion identifiers of the target character also are associated with animation controls that control the animation of the target character. For example, a character may be rigged such that hip and chest elements control the animation of elements in a spine connected between the hip and the chest. If the hip and chest elements also are the tagged portion identifiers of the target character, then motion transferred from the corresponding hip and chest elements of the source character can be used to animate the elements of the spine of the target character.

To transfer motion between the source and target characters, the motion 104 associated with the structure or portion of the source character corresponding to the tagged portion identifiers is determined. In particular, the motion data (i.e., the position and orientation for each frame of the animation) for each such portion or structure of the source character is derived from the animation controls, motion capture data and any other information used to animate the character.

Using the tagged portion identifiers of the source character 100 and the tagged target character 152 and the motion 104, a retargeting module 121 retargets motion 104 to obtain retargeted motion 140. For example, conventional motion retargeting techniques can be used to retarget the motion portions or structures of the source character corresponding to the set of tagged portion identifiers to the corresponding portions or structures of the target character. A particular embodiment of retargeting is described in more detail below. Motion 104 associated with the source character portions corresponding to the tagged portion identifiers is retargeted on a frame by frame basis to the corresponding portions of the target character.

The retargeted motion 140 is then attached to the portions of target character 150 to which the portion identifiers refer. As a result, the animation of the tagged portion identifiers representing the topology of the target character animates the target character with motion that is similar to that of the source character. To the extent that the portion identifiers of the target character are associated with animation controls for manipulating other parts of the target character topology, more usable motion transfer can be achieved.

Figure 2:
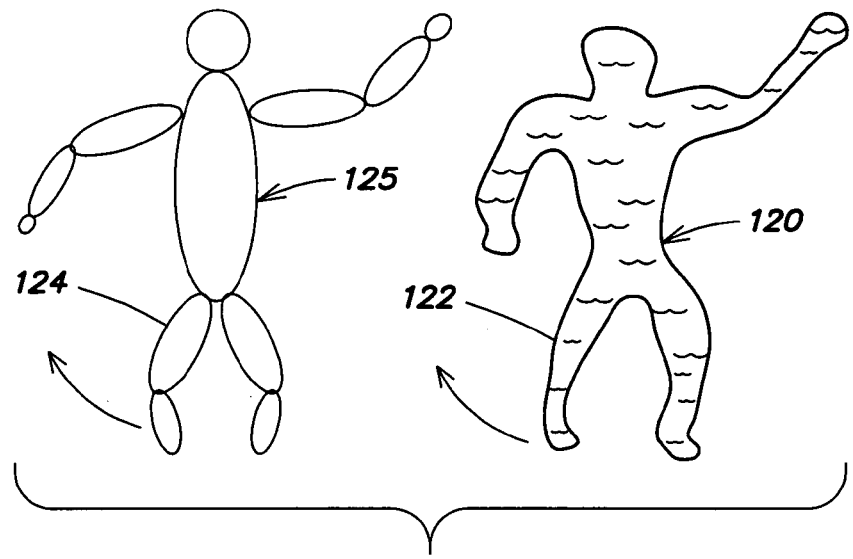
FIG. 2 is an illustration of source and target animated characters, wherein one of the characters has no skeletal structure.

With reference to FIG. 2, rigless retargeting also permits motion to be retargeted to or from a character 120 (e.g., a character composed of particles) that has no skeletal structure. Conventional computer graphic particle systems permit a user to create characters comprised of clouds of particles having constraints on volumetric boundaries of particle motion and to assign properties such as, for example, particle spread and speed to the particles within the volume. Also, some particles in a particle cloud portion of a character may be defined to be particle attractors that guide the destinations of other particles, which may swarm towards or around the particle attractors within the defined particle cloud volume. Rigless retargeting permits motion to be mapped from a portion of the source character to some or all of the particles and/or particle attractors of the particle cloud portion of the target character. For example, since descriptive files do not require a skeletal structure, rather only implicit information represented by a hierarchical arrangement of labeled data structures (including portion identifiers and functionality descriptors), motion of a right leg portion 124 of a source character 125 may be retargeted to a right leg portion 122 of the cloud particle character 120 if there are matching portion identifiers in their respective source and target description files. That is, some or all of the particles and/or particle attractors of the "right leg" portion 122 of the target character 120 would be represented as right_thigh, right_shin and right_foot descriptive file data objects in order to correspond to right leg portion 124 of the source character 125. Motion from source character 125 having a skeletal structure may, thus, be retargeted to some or all of the corresponding particles (and/or particle attractors) of the target character portion. It will be further appreciated that neither character need have a skeletal structure.

Figure 3:
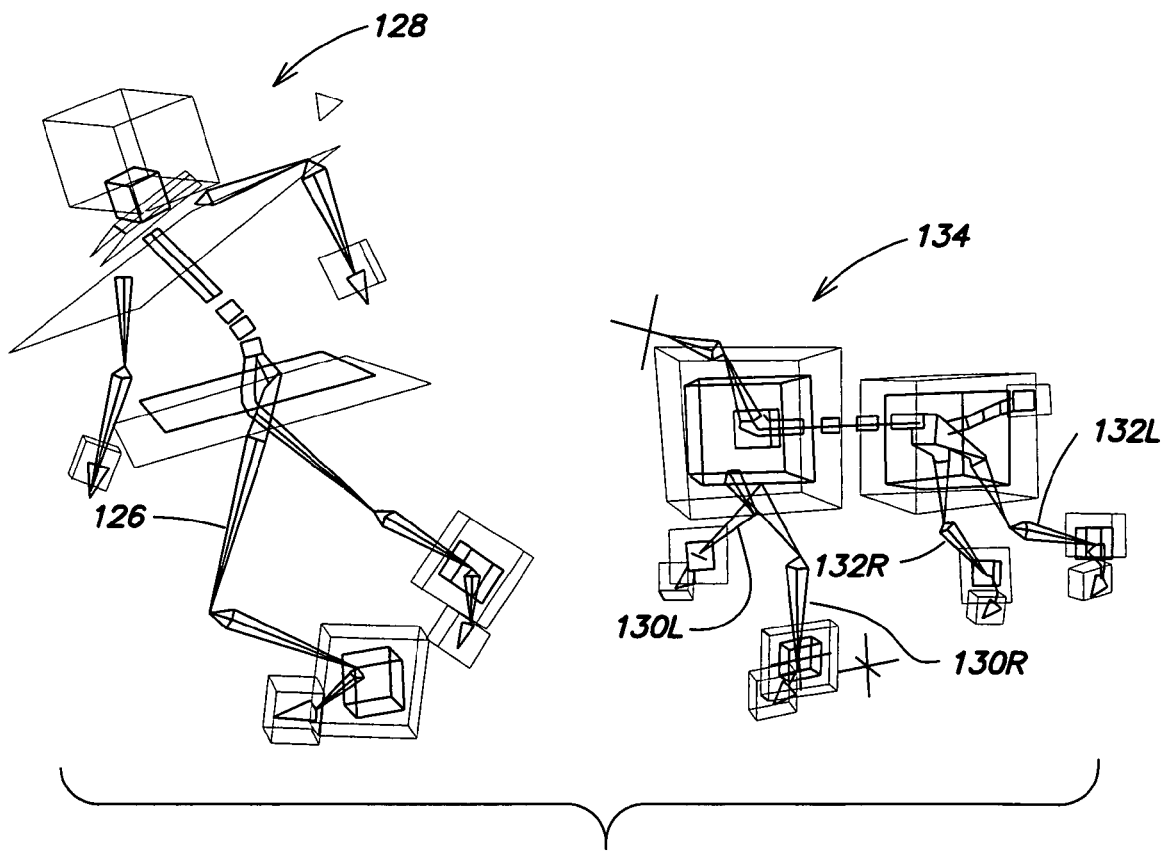
FIG. 3 is an illustration of source and target animated characters, wherein one of the characters is of a biped class and the other character is of a quadraped class.

With reference to FIG. 3, rigless retargeting similarly permits retargeting of motion from a single portion 126 of a source character such as, for example, a left leg of bipedal character 128, to multiple corresponding portions of a target character such as, for example, right and left front legs 130R, 130L and right and left rear legs 132R,132R of a quadrupedal character 134. As described above, the skeletal structures of the 'legs' of target character 134 typically have predefined relationships to one another that allows a graphics system to perform transformations in order to achieve realistic character motions. These relationships can be exploited by the system to retarget motions between, for example, the left leg of a biped that may not have completely identical legs as those of the quadruped. For instance, if motion is retargeted from the pelvis and right_foot portions of the bipedal character 128 and to corresponding portions of the quadruped character 134, then the predetermined relationships between the quadruped character's pelvis and right foot may determine the appropriate motion of the skeletal structures between the pelvis and right foot. Additionally, a scaling transformation, such as a polarity flipping, may be applied to account for articulation differences between elements of the source and target characters (e.g., where a source character joint has a corresponding target character joint with an opposite articulation.) A polarity flipping technique may also be utilized in order to achieve more realistic target character motion. For example, a forward motion of a left leg of the biped character may be mapped as a forward motion to a pair of legs (front left and rear right) of the quadruped and as a backward motion (i.e., out of phase) to the other pair of legs (front right and rear left.)

Figure 4:
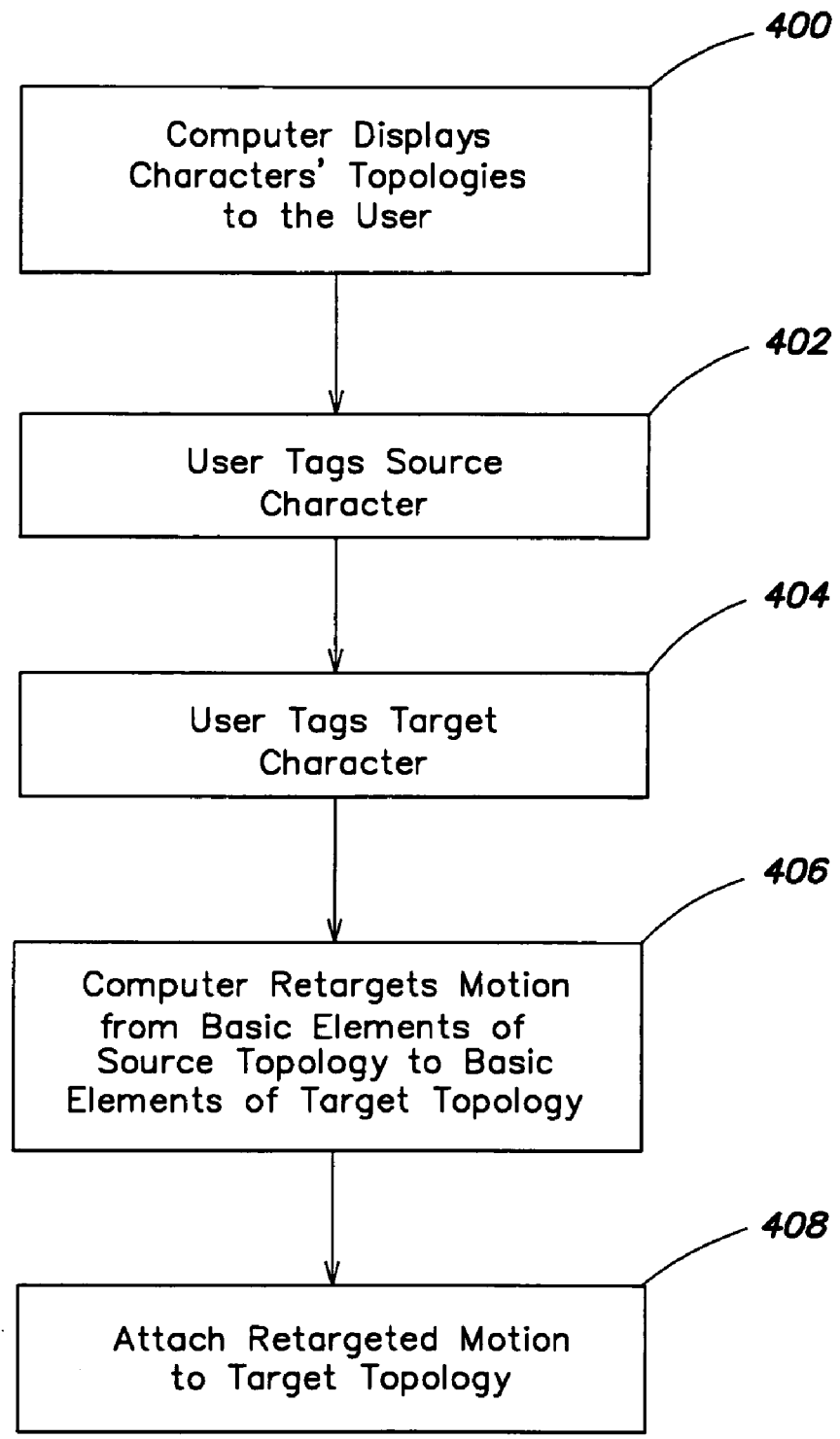
FIG. 4 is a flow chart describing an embodiment of a workflow for transferring motion from a source character to a target character.

Referring now to FIG. 4, a flow chart describing one embodiment of a workflow using a system as shown in FIG. 1 will now be described. Given a source character and a target character, the topologies of these characters is displayed (400) to the user as one or more descriptive files comprised of a hierarchy of data objects including portion identifiers and functionality descriptors associated with portions of the respective source or target topology. The user indicates what elements or portions in the source and target characters correspond to each other. This indication may be achieved by tagging the data objects in the source character (402) and in the target character (404), by providing user input to the tagging module as described above. After both the target and the source characters are tagged, the computer retargets (406) the motion from the tagged data objects of the source character descriptive file to the tagged data objects of the target character descriptive file. After the motion is retargeted, the retargeted motion is attached (408) to the target character.

Figure 5:
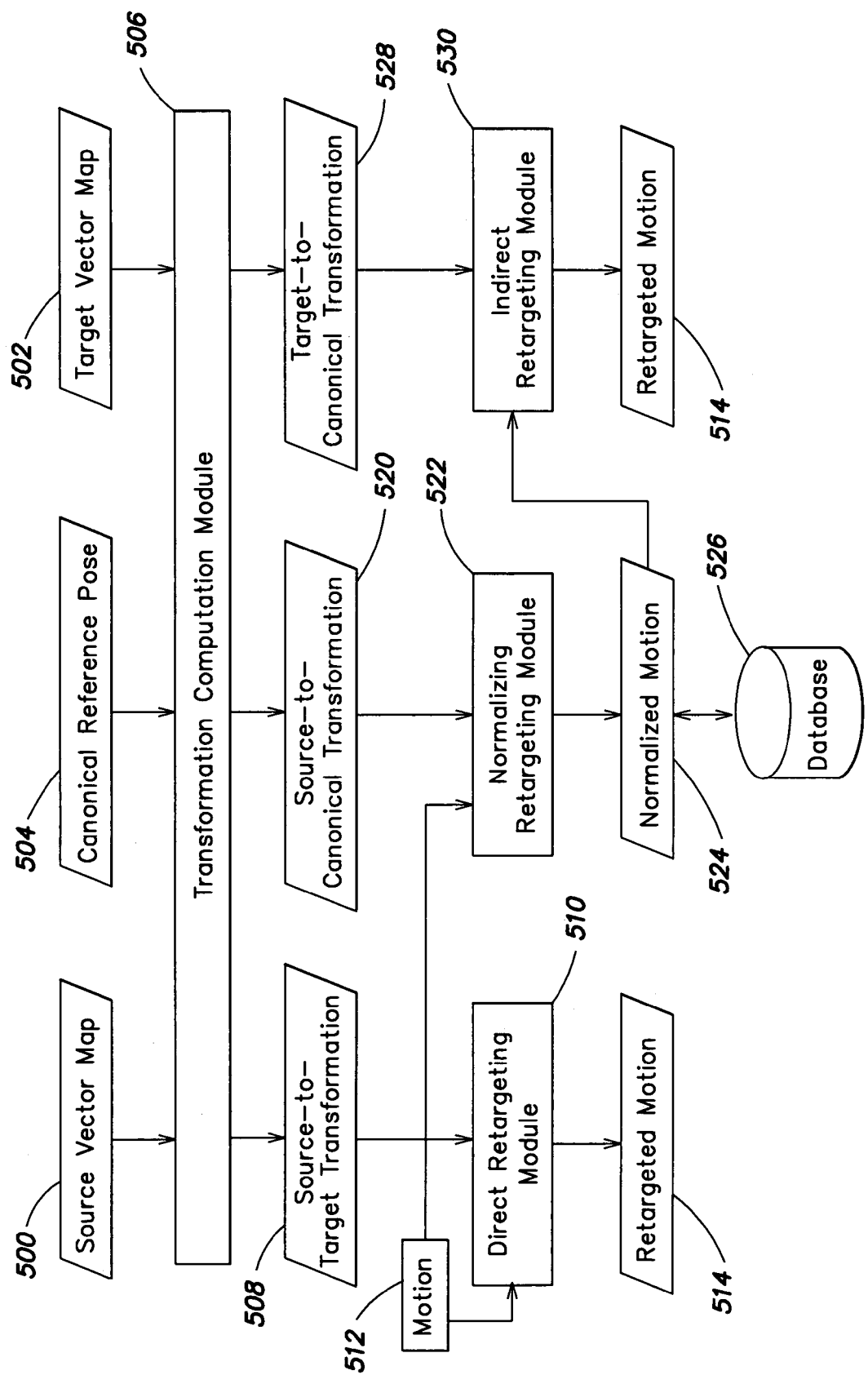
FIG. 5 is a data flow diagram describing an embodiment of retargeting motion.

Referring now to FIG. 5, one embodiment of retargeting will now be described. A set of vector maps is defined to represent the orientations of the portions of the characters identified by the tagged portion identifiers. One vector map 500 represents the corresponding portions of the source character. Another vector map 502 represents the corresponding portions of the target character. Yet another vector map 504 can be used to represent a set of corresponding portions of a canonical topology in a default orientation. The vector map representing this set of canonical corresponding portions may be understood as defining a canonical topology, and the default orientation may be understood as a reference pose. Because the frames of reference of the source and target characters and the canonical reference pose may be different, transformations among these frames of reference are computed.

In one embodiment, the user places the source character and the target character in the same pose through a graphical user interface. A source-to-target transformation 508 between the frames of reference of the source and target characters is computed by a transformation computation module 506 given these known orientations of the source and target characters. The direct retargeting module 510 retargets the motion 512 of the corresponding portions of the source character identified by the tagged portion identifiers to the corresponding portions of the target character using this transformation and the vector maps representing the set of corresponding portions of the source and target characters, resulting in retargeted motion 514.

Alternatively, the user may place the source character in the same pose as the reference pose for a canonical topology. A source-to-canonical transformation 520 between the frame of reference of the source character and the frame of reference for the canonical topology may be computed. This transformation may be stored with the source character. The normalizing retargeting module 522 retargets the motion 512 of the corresponding identified portions of the source character to the canonical topology using this transformation 520 and the vector maps representing the set of corresponding identified portions of the source character and the canonical topology.

In this embodiment, the result is a normalized representation of the motion 524 of the structures or portions of the source character. This normalized motion can be stored along with a representation of the canonical topology to which it corresponds, for example in database 526. The database 526 thus may provide the capability of building a library or database of motion for different characters that can be reused for many different target characters. Such a database could be used, for example, by selecting a normalized motion and by matching elements of the topology of the target character to the canonical topology associated with the selected normalized motion. The database also could be searched by matching selected elements of a target character to canonical reference poses referenced in the database to identify motions corresponding to the selected elements of the target character.

For any target character having a subset of portion identifiers that can be matched to a subset of portion identifiers of a canonical topology, the normalized motion can be transferred from the canonical topology to the target character. The target character is placed in the same pose as the reference pose for the canonical topology, by the user through a graphical user interface. A target-to-canonical transformation 528 between the frame of reference of a target character and frame of reference of the canonical topology is computed. This transformation may be stored with the target character. Given a set of source characters and target characters of the same class, these transformations normalize orientations across the class of characters. An indirect retargeting module 530 receives stored normalized motion 524 and retargets it from the canonical topology to the identified portions of the target character using transformation 528 and the vector maps representing the set of corresponding identified portions of the target character and the canonical topology, resulting in retargeted motion 514.

In these embodiments, if the transformations among the various frames of reference are known, they need not be computed.

The various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, a cathode ray tube (CRT) display, liquid crystal displays (LCD) and other video output devices, printers, communication devices such as a modem, and storage devices such as disk or tape. One or more input devices may be connected to the computer system. Example input devices include, but are not limited to, a keyboard, keypad, track ball, mouse, pen and tablet, communication device, and data input devices. The invention is not limited to the particular input or output devices used in combination with the computer system or to those described herein.

The computer system may be a general purpose computer system which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services.

A memory system typically includes a computer readable medium. The medium may be volatile or nonvolatile, writeable or nonwriteable, and/or rewriteable or not rewriteable. A memory system stores data typically in binary form. Such data may define an application program to be executed by the microprocessor, or information stored on the disk to be processed by the application program. The invention is not limited to a particular memory system.

A system such as described herein may be implemented in software or hardware or firmware, or a combination of the three. The various elements of the system, either individually or in combination may be implemented as one or more computer program products in which computer program instructions are stored on a computer readable medium for execution by a computer. Various steps of a process may be performed by a computer executing such computer program instructions. The computer system may be a multiprocessor computer system or may include multiple computers connected over a computer network. The components shown in FIG. 1 may be separate modules of a computer program, or may be separate computer programs, which may be operable on separate computers. The data produced by these components may be stored in a memory system or transmitted between computer systems.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A computer-implemented method for transferring motion associated with a source character to a target character in a graphics scene, the method comprising the steps of:
    defining a source topology associated with the source character that comprises a hierarchy of source data objects, wherein each source data object relates to a different portion of the source character and is associated with a different source portion identifier and a different source functionality descriptor, and wherein the source topology is stored in one or more source descriptive files;
    defining a target topology associated with the target character that comprises a hierarchy of target data objects, wherein each target data object relates to a different portion of the target character and is associated with a different target portion identifier and a different target functionality descriptor, and wherein the target topology is stored in one or more target descriptive files;
        receiving a user input comprising a first source data object related to the source character and one or more target data objects related to the target character;
    tagging a first source portion identifier associated with the first source data object and one or more target portion identifiers associated with the one or more target data objects;
    determining a set of target data objects within the one or more target data objects based on the tagged first source portion identifier and a source functionality descriptor associated with the first source data object, wherein each target data object included in the set of target data objects is associated with a tagged target portion identifier corresponding to the tagged first source portion identifier and a target functionality descriptor corresponding to the source functionality descriptor;
    defining a source vector map to store orientation data that indicates the orientation of the first source object and motion data that indicates the motion associated with the first source object;
    computing a source-to-canonical transformation between a frame of reference of the source topology and a frame of reference of a canonical topology that is not associated with the source character or the target character, wherein the frame of reference of the source topology and the frame of reference of the canonical topology are different;
    retargeting motion from the source topology to the canonical topology based on the source-to-canonical transformation and the motion data included in the source vector map to produce a normalized representation of the motion associated with the first source object;
    computing a target-to-canonical transformation between a frame of reference of the target topology and the frame of reference of the canonical topology, wherein the frame of reference of the target topology and the frame of reference of the canonical topology are different;
    retargeting the normalized representation of the motion associated with the first source object to the target topology based on the target-to-canonical transformation to produce retargeted motion associated with the set of target data objects;
    storing in memory the normalized representation of the motion and the canonical topology in a database of motion for reuse with a different target character.

2. The computer-implemented method of claim 1, wherein at least one of the source character or the target character does not have a skeletal structure.

3. The computer-implemented method of claim 1, wherein the step of tagging comprises the step of applying a mutable tag to the first source portion identifier and/or the one or more target portion identifiers.

4. The computer-implemented method of claim 1, wherein the set of target data objects comprises a plurality of target data objects.

5. The computer-implemented method of claim 4, wherein the first source object comprises an appendage of a bipedal source character and the plurality of the target data objects comprise multiple appendages of a quadruped target character.

6. The computer-implemented method of claim 1, wherein the step of transferring motion comprises the step of storing the transformed motion data in the one or more target descriptive files.

7. A system configured to transfer motion associated with a source character to a target character, the system comprising:
    a storage device configured to store a set of program instructions; and
    a processor configured to execute the set of program instructions that, when executed, cause the processor to perform the steps of:
        defining a source topology associated with the source character that comprises a hierarchy of source data objects, wherein each source data object relates to a different portion of the source character and is associated with a different source portion identifier and a different source functionality descriptor, and wherein the source topology is stored in one or more source descriptive files, defining a target topology associated with the target character that comprises a hierarchy of target data objects, wherein each target data object relates to a different portion of the target character and is associated with a different target portion identifier and a different target functionality descriptor, and wherein the target topology is stored in one or more target descriptive files, receiving a user input comprising a first source data object related to the source character and one or more target data objects related to the target character, tagging a first source portion identifier associated with the first source data object and one or more target portion identifiers associated with the one or more target data objects, determining a set of target data objects within the one or more target data objects based on the tagged first source portion identifier and a source functionality descriptor associated with the first source data object, wherein each target data object included in the set of target data objects is associated with a tagged target portion identifier corresponding to the tagged first source portion identifier and a target functionality descriptor corresponding to the source functionality descriptor, defining a source vector map to store orientation data that indicates the orientation of the first source object and motion data that indicates the motion associated with the first source object, computing a source-to-canonical transformation between a frame of reference of the source topology and a frame of reference of a canonical topology that is not associated with the source character or the target character, wherein the frame of reference of the source topology and the frame of reference of the canonical topology are different, retargeting motion from the source topology to the canonical topology based on the source-to-canonical transformation and the motion data included in the source vector map to produce a normalized representation of the motion associated with the first source object, computing a target-to-canonical transformation between a frame of reference of the target topology and the frame of reference of the canonical topology, wherein the frame of reference of the target topology and the frame of reference of the canonical topology are different, retargeting the normalized representation of the motion associated with the first source object to the target topology based on the target-to-canonical transformation to produce retargeted motion associated with the set of target data objects, and storing in memory the normalized representation of the motion and the canonical topology in a database of motion for reuse with a different target character.

8. The system of claim 7, wherein at least one of the source character or the target character does not have a skeletal structure.

9. The system of claim 7, wherein the step of tagging comprises the step of applying a mutable tag to the first source portion identifier and/or the one or more target portion identifiers.

10. The system of claim 7, wherein the set of target data objects comprises a plurality of target data objects.

11. The system of claim 10, wherein the first source object comprises an appendage of a bipedal source character and the plurality of the target data objects comprise multiple appendages of a quadruped target character.

12. The system of claim 7, wherein the step of transferring motion comprises the step of storing the transformed motion data in the one or more target descriptive files.

* * * * *